United States Patent
Wallisch et al.

(10) Patent No.: US 11,643,508 B2
(45) Date of Patent: May 9, 2023

(54) METHOD FOR THE PREPARATION OF A LIGNIN PREPOLYMER

(71) Applicant: ANNIKKI GMBH, Raaba-Grambach (AT)

(72) Inventors: Kerstin Wallisch, Vienna (AT); Simone Knaus, Vienna (AT)

(73) Assignee: ANNIKKI GMBH, Raaba-Gramach (AT)

( * ) Notice: Subject to any disclaimer, the term of this patent is extended or adjusted under 35 U.S.C. 154(b) by 132 days.

(21) Appl. No.: 16/616,013

(22) PCT Filed: May 29, 2018

(86) PCT No.: PCT/EP2018/064077
§ 371 (c)(1),
(2) Date: Nov. 22, 2019

(87) PCT Pub. No.: WO2018/219954
PCT Pub. Date: Dec. 6, 2018

(65) Prior Publication Data
US 2020/0140623 A1 May 7, 2020

(30) Foreign Application Priority Data
May 29, 2017 (EP) ..................................... 17173188

(51) Int. Cl.
*C08H 7/00* (2011.01)
*C08L 97/00* (2006.01)
*C09D 197/00* (2006.01)

(52) U.S. Cl.
CPC .............. *C08H 6/00* (2013.01); *C08L 97/005* (2013.01); *C09D 197/005* (2013.01)

(58) Field of Classification Search
None
See application file for complete search history.

(56) References Cited

U.S. PATENT DOCUMENTS

| | | | |
|---|---|---|---|
| 4,265,809 A * | 5/1981 | Holsopple | C08G 59/02 523/400 |
| 4,367,326 A | 1/1983 | Blount | |
| 4,918,167 A * | 4/1990 | Glasser | C08H 6/00 530/502 |
| 5,102,991 A | 4/1992 | Glasser | |
| 5,373,070 A | 12/1994 | Gardziella et al. | |
| 5,959,067 A * | 9/1999 | Bakker | C09D 167/08 528/295.3 |
| 6,054,562 A * | 4/2000 | Kurple | C08L 71/02 530/505 |
| 8,053,566 B2 * | 11/2011 | Belanger | D21C 11/0007 530/507 |
| 9,115,246 B2 | 8/2015 | Kunst | |
| 2011/0098384 A1 | 4/2011 | Blount | |
| 2011/0274612 A1* | 11/2011 | Wohlmann | C08H 6/00 423/447.2 |
| 2012/0022240 A1* | 1/2012 | Belanger | C07G 1/00 530/507 |
| 2014/0243511 A1* | 8/2014 | Tamminen | C08L 97/005 530/500 |
| 2014/0249271 A1* | 9/2014 | Pietarinen | C08L 97/005 530/500 |
| 2014/0275435 A1* | 9/2014 | Holmberg | C08F 290/06 525/401 |
| 2015/0315411 A1* | 11/2015 | Meijer | C09D 157/10 427/385.5 |
| 2016/0355535 A1* | 12/2016 | Venditti | C07G 1/00 |

FOREIGN PATENT DOCUMENTS

| | | | |
|---|---|---|---|
| WO | WO2009/028969 | 3/2009 | |
| WO | WO2013050661 | 4/2013 | |
| WO | WO-2013050661 A1 * | 4/2013 | ............... C07G 1/00 |
| WO | WO-2013113462 A1 * | 8/2013 | ............... C07G 1/00 |
| WO | WO-2015094099 A1 * | 6/2015 | ............... C07G 1/00 |
| WO | WO2016118411 | 7/2016 | |

OTHER PUBLICATIONS

International Search Report issued in PCT/EP2018/064077 dated Jul. 25, 2018.

* cited by examiner

*Primary Examiner* — Satya B Sastri
(74) *Attorney, Agent, or Firm* — Workman Nydegger

(57) ABSTRACT

The present invention relates to a method for the preparation of a lignin prepolymer, comprising (a) providing a lignin; (b) reacting the lignin with a hydroxyl functionalization reagent to provide a lignin derivative containing at least one hydroxyl group, said hydroxyl group being obtained as a result of the interaction between the lignin and the hydroxyl functionalization reagent (c) reacting the lignin derivative obtained in step (b) with a functionalization reagent selected from the group consisting of fatty acids, fatty acid derivatives and mixtures thereof capable to react with the lignin derivative resulting in a covalent bond between the fatty acid and/or or the fatty acid derivative and the lignin derivative.

20 Claims, No Drawings

METHOD FOR THE PREPARATION OF A LIGNIN PREPOLYMER

FIELD OF THE INVENTION

The present invention relates to methods of producing a variety of lignin derivatives that can be used for alkyd coatings and to the use of lignin as basic material for alkyd resins in general. The invention relates in particular to lignin derivatives comprising unsaturated fatty acid moieties. Typically alkyds according to the present invention can be used in inks, paints, varnishes, adhesives and glues.

BACKGROUND OF THE INVENTION

Lignin Isolation and Valorization

Recently the use of lignocellulosic materials (e.g. wood, straw or paper wastes) for the production of fuels and synthetic polymers has been attracting more attention due to increasing concerns about the depletion of the raw oil resources on earth. Lignocellulosic biomass is the most abundantly available renewable raw material on earth and has big potential as sustainable alternative to fossil fuels. Compared to arable crops like sugar cane, corn, wheat and sugar beet which are used for first generation bioethanol, lignocellulosic biomass has the big advantage that only nonedible parts of the plants or non-food crops such as switchgrass, jatropha or miscanthus are converted. For the production of chemicals and second generation fuels from carbohydrates and lignin (obtained from lignocellulosic materials), the natural polymeric components must be separated cleanly from each other. The isolation of pure lignocellulosic components (cellulose, hemicellulose and lignin) is very challenging because the lignocellulosic cell walls are very recalcitrant to bioprocessing and degradation. This is due to strong crosslinking between the polysaccharides and lignin via ester and ether linkages, the so-called lignin-carbohydrate complexes (LCC). Classical delignification methods (e.g. Soda, Kraft and Sulfite pulping processes) which are described in detail in the "Handbook for Pulp & Paper Technologies", 2nd Edition, G. A. Smook, Angus Wilde Publications (1992)" often focus on the valorization of cellulose and deliver only low quality lignin (contaminated with sugars and/or containing sulfur). These lignins are often burned for energy recovery, only a very small amount is used otherwise, mainly for low-value applications. Due to the proposed large increase of second generation biofuels, 62 million tons of lignin will be produced by 2022 (A. J. Ragauskas, et al., Science, 2014, 344, 1246843.). Consequently in the very near future there will be a big need for new value-added products from lignin, otherwise the amount of lignin produced would far exceed the current world market demand for specialty products as well as the amount of lignin needed to supply necessary process energy by combustion. Although fundamental research on converting lignin to chemicals, materials and fuel has already been carried out, very little of this effort has been translated into commercial practice. (A. J. Ragauskas, et al., Science, 2014, 344, 1246843.) The availability of very pure lignin, which is the most abundant renewable feedstock composed of aromatics, could improve this situation considerably. A process to isolate very pure carbohydrate-free lignin from different lignocellulosic feedstocks was described in e.g. WO/2011/014894. Such pure lignins can be utilized in the production of high value synthetic polymers. Potential high value products from pure isolated lignin include carbon fibers, engineering plastics and thermoplastic elastomers, polymeric foams and membranes, and a variety of chemicals all currently sourced from petroleum. (A. J. Ragauskas, et al., Science, 2014, 344, 1246843.)

Alkyds

Alkyd resins have been used as binders for paints in the coating industry since the 1930s. Their compatibility with many polymers together with the extremely wide formulating latitude makes them suitable for the manufacture of a very broad range of coating materials. Examples include do-it-yourself paints and varnishes for wood and metal, road marking paints, anticorrosive paints, nitrocellulose lacquers, stoving enamels, etc. (A. Hofland, Process in Organic Coatings, 2012, 73, 274-282). Today, they still are the largest group of synthetic resins and are the workhorse polymers for the production of paints, coatings and printing inks. They show good gloss retention, durability, weathering resistance and are inexpensive. Alkyds are produced from polybasic acids, in particular usually from their anhydrides (e.g. phthalic anhydride, maleic anhydride or trimellitic acid anhydride), and polyhydric alcohols (usually glycerol, trimethylolpropane or pentaerythritol) by polycondensation reaction. They are also known as oil-modified polyesters due to the presence of fatty acids in the polymer backbone. A typical alkyd resin from phthalic anhydride, glycerol and linoleic acid has the following structure:

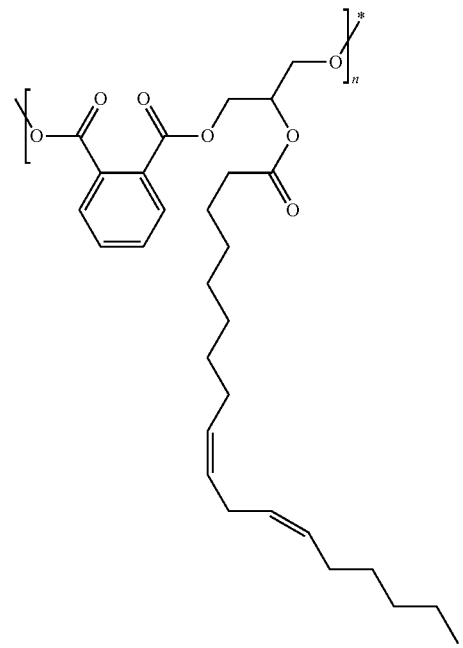

For the preparation of alkyd resins either the triglyceride or the free fatty acids may be used. These two methods are referred to as the alcoholysis (monoglyceride) process and the fatty acid process. The latter one yields alkyd resins of higher quality because the composition of the final resin can easily be controlled. But more economical is the two-step alcoholysis process which consists of the transesterification of the triglycerides into mono- and diglycerides as first step. However, higher reactions temperatures of approximately 250° C. and a longer reaction time are needed resulting in a darker resin with a more randomly oriented structure (Stoye, D.; Freitag, W., Hrsg., Lackharze, Hanser: Munchen, (1996)). Another disadvantage is that glycerol remains in the final product and can be converted into toxic acrolein at high temperatures. Alkyd resins are most commonly classified by their oil content and the type of oil used. Properties of the final resins, especially their drying character (drying, semi-drying or nondrying alkyds), are strongly influenced therefrom. The majority of the fatty acids used in alkyd resins are derived from vegetable oils, most commonly used is soybean oil. Linseed oil is typically used for fast drying alkyds, tall oil and safflower oil for drying alkyds, and castor oil and coconut oil are extensively used in nondrying alkyds. Depending on the oil content, alkyds are referred to as short oil (<40%), medium oil (40-60%) or long oil (>60%). Drying alkyds are cured in air via a series of chemical reactions known as autooxidation. This autooxidative process is usually accelerated by the addition of driers (generally metal salts like cobalt naphthenate). Alkyd resins can be modified with phenolic resin, acrylic monomers, styrene, epoxy resin, silicone resin or isocyanantes. So properties of the resulting resins can be tailored in view of the properties required for the particular applications. Except for phthalic anhydride, being of petrochemical origin, the other major components of alkyd coatings (glycerol and fatty acids or triglyceride oils) can be derived from low cost renewable resources. In recent years, efforts have been made to reduce the solvent content of alkyd resins, resulting in the development of alkyd emulsions, high solid alkyds and waterborne binders (A. Hofland, Process in Organic Coatings, 2012, 73, 274-282, Jones, F. N., Alkyd Resins. Ullmann's Encyclopedia of Industrial Chemistry, 2003.)

Lignin Modification and Use of Lignin Derivatives

Lignin exhibits a structure based on phenyl-propanoic units equipped with a number of functional groups making it an excellent sustainable raw material for chemical modification. But there are also drawbacks like poor solubility and low reactivity, which limit both its use in industrial applications. One way to overcome these technical limitations is to modify lignin by oxypropylation, a method well described in literature (J. P. S. Aniceto, et al., ChemSusChem, 2012, 5, 1358-1368; L. C.-F. Wu and W. G. Glasser, Journal of Applied Polymer Science, 1984, 29, 1111-1123). The grafting of lignin functionalities (aliphatic hydroxyls, phenolic hydroxyls and carboxylic acid groups) with propylene oxide (PO) leads to an improvement of the solubility, uniformity and reactivity. But—according to most literature citations—liquefaction of lignin by oxypropylation requires temperatures considerably higher than 100° C. WO 2013/113462 (A1) describes oxypropylation of a low-molecular weight lignin fraction obtained from wheat straw by EtOH/NaOH pulping. The oxypropylated lignin could be successfully liquefied by temperatures of 100° C. and below. Oxypropylated lignins are nearly exclusively used as polyols for the manufacture of polyurethanes, in particular rigid polyurethane foams (H. Nadji, et al., Macromolecular Materials and Engineering, 2005, 290, 1009-1016; C. A. Cateto, et al., Ind. Eng. Chem. Res., 2009, 48, 2583-2589).

Only few examples of postmodification of oxypropylated lignins for the synthesis of prepolymers are mentioned in literature. In U.S. Pat. No. 4,918,167 the reaction of oxyalkylated lignins with epichlorohydrin for the preparation of prepolymers for epoxy resins is described. Also a method for modifying oxyalkylated lignins with (meth)acryloyl groups by reaction with reagents such as isocyanatoethyl methacrylate, methacrylic anhydride or methacryloyl chloride for obtaining polymerizable derivatives is claimed there.

Other examples are the use of acrylated oxypropylated lignin for suspension polymerization yielding functionalized lignin beads (D. Saidane, et al., Journal of Applied Polymer Science, 2012, 128, 424-429) or for UV-curable coatings (WO 1996/012774). But, to the best of the inventor's knowledge, fatty acid derivatives of lignin and lignin polyols have not been used as building blocks for the preparation of drying, semi-drying or non-drying alkyd resins. Also the functionalization of oxyalkylated lignins with fatty acids (e.g. oleic acid, linoleic acid, ricinoleic acid or saturated fatty acids) and their methyl esters (FAME), respectively, has not been described yet.

However, state of the art is the modification of native lignins with fatty acid chlorides and fatty acid anhydrides, respectively. In US 2014/0243511 A1 a commercially available softwood lignin was esterified with tall oil fatty acid chlorides for the use as barrier material in fiber-based packaging material. The compositions obtained in US 2014/0243511 are non-drying. Modifying lignin with fatty acid chlorides is also known from EP 2 711 396 A1.

Another example is the esterification of an organosolv lignin with oleic acid chloride for, subsequently, producing a macropolyol as building block for segmented polyurethanes (S. Laurichesse, et al., Green Chemistry, 2014, 16, 3958-3970). But esterification of lignin with acid chlorides of linseed oil fatty acids, in particular with linoleic acid chloride, in view of the preparation of drying alkyds is not known so far. Also the synthesis of lignin derivatives from ricinoleic acid has not been described yet. Regarding alkyd resins, only the use of unmodified lignin as filler in alkyd wood coatings, inks, varnishes and paints has been reported (M. N. Belgacem, A. Blayo and A. Gandini, Industrial Crops and Products, 2003, 18, 145-153; A. M. Issam, et al., European Coatings Journal, 2010, 2, 24-27). The functionalization of lignin with fatty acids and use of the corresponding derivatives as main component in alkyds is unknown. Also baking enamels from lignin polyols partially functionalized with fatty acids have not been reported yet.

Purpose of the Invention

The purpose of the invention is to provide a new type of alkyds based on a high content of renewable raw materials. Lignin is used as novel renewable starting material for alkyd prepolymers and crosslinked coatings therefrom. Further, one purpose of the invention is the synthesis of lignin fatty esters from oxyalkylated lignin which avoids the use of reactive derivatives such as fatty acid chlorides or fatty acid anhydrides. Oxyalkylated lignins provide reactive hydroxyl groups so that esterification with pure fatty acids or transesterification with fatty acid methyl esters (FAME) is possible in good yields. Such lignin derivatives exhibit lower glass transition points and increased thermoplasticity. Furthermore, by esterification with unsaturated fatty acids airdrying alkyd coatings can be obtained, by esterification with mixtures of saturated and unsaturated fatty acids semidrying alkyd coatings can be obtained, and by partial esterification of the hydroxyl groups and by esterification with ricinoleic acid lignin-based HO-functional building blocks for alkyds can be obtained. The latter might especially be suited for use in non-drying alkyds (baking enamels). Alkyds produced in described manner can be useful in coatings, inks, varnishes, paints, adhesives, glues and a variety of other applications.

SUMMARY OF THE INVENTION

The present invention provides a method for the preparation of a lignin prepolymer, comprising
  (a) providing a lignin;
  (b) reacting the lignin with a hydroxyl functionalization reagent to provide a lignin derivative containing at least one hydroxyl group, said hydroxyl group being obtained as a result of the interaction between the lignin and the hydroxyl functionalization reagent (c) reacting the lignin derivative obtained in step (b) with a functionalization reagent selected from the group consisting of fatty acids, fatty acid derivatives and mixtures thereof capable to react with the lignin derivative resulting in a covalent bond between the fatty acid and/or the fatty acid derivative and the lignin derivative.

Furthermore, the present invention provides a method for the preparation of a polymer from the lignin prepolymer as well as lignin prepolymers and polymers obtainable according to the method of the present invention.

Preferred embodiments of the present invention are listed in the dependent claims.

DETAILED DESCRIPTION OF THE INVENTION

Alkyds of the present invention are produced by modifying lignin derivatives (preferably oxyalkylated lignin) with fatty acids and their derivatives.

Definitions

The following definitions are used in this disclosure.

The term "lignin" generally includes lignin derived from all kind of lignocellulose pulping processes, e.g. kraft, sulfite, soda, organosolv or steam exploded lignin. In a preferred embodiment, lignin obtained by pulping wheat straw with an aqueous alcoholic solution comprising an inorganic base, such as disclosed in WO 2011/014894 is used.

As used herein, the term "lignin derivatives" refers to lignin reacted with a hydroxyl-functionalizing reagent. Possible "hydroxyl-functionalizing reagents" include epoxides, preferably $C_2$-$C_8$ epoxides, more preferably ethylene oxide or propylene oxide, or cyclic mono- or diesters, preferably $C_3$-$C_8$ lactones such as ε-caprolactone or β-propiolactone or lactide.

The term "fatty acid" or "fatty acid residue" or "fatty acid moiety" means the group R of a fatty acid R—COOH, or of the corresponding fatty acid derivative. The R group is typically bonded to the lignin or lignin derivative backbone through an ester linkage.

The term "fatty acid derivative" includes anhydrides, acid chlorides and mixtures thereof.

Methods

Exemplarily, lignin-based alkyd coatings may be prepared according to one of the following methods. The preparation of such lignin-based alkyd coatings according to the present invention is not limited to one of these methods.

Steps (a), (b) and (c)

In one aspect the present invention provides a method for the production of drying, semi-drying or non-drying alkyds, comprising i) preparing lignin from any lignocellulosic starting material by any state-of-the-art pulping process, in one aspect from agricultural residues, by pulping with alcohol, in particular with a $C_{1-4}$ alcohol, in particular ethanol, water and a base, in particular a hydroxide, in particular NaOH, at a temperature between 70° C. and 150° C., ii) reacting lignin obtained in i) with an aliphatic saturated or unsaturated epoxide, in particular an alkylene oxide, in particular ethylene oxide or propylene oxide in the presence of a base, in particular a hydroxide, in particular KOH or NaOH, and isolating the polyols obtained, iii) reacting the lignin polyols obtained in ii) with unsaturated fatty acids or mixtures of saturated and unsaturated fatty acids or their corresponding methyl esters (FAME), preferably fatty acids from, but not limited to, linseed oil, castor oil, sunflower oil, tall oil, etc., most preferable linoleic acid and linoleic acid methyl esters, respectively, and isolating the lignin prepolymers, iv) curing the lignin prepolymers from unsaturated fatty acids obtained in iii) under air, preferably with the help of drying agents, most preferable with metal salts (e.g. cobalt naphthenate) or enzymes (e.g. laccase) or preparing baking enamels from partially esterified lignin prepolymers obtained in iii).

Lignocellulosic Starting Material

The lignocellulosic starting material may be obtained from any suitable softwood or hardwood available, as well as from any annual plant. In one embodiment of the present invention the lignocellulosic material as starting material for the lignin isolation herein includes, but is not limited to biorefinery crops. Examples of such lignocellulosic materials may include, but are not limited to miscanthus, sugar cane bagasse, soybean stover, corn stover, rice straw, barley straw, wheat straw, energy crops, especially elephant grass, switch grass and/or husk, hay and combinations thereof. Preferably, the lignocellulosic material includes agricultural residues such as wheat straw, barley straw, oat straw, rice straw, canola straw, and soybean stover; grasses such as switch grass, miscanthus, cord grass, and reed canary grass; fiber process residues such as sugar cane bagasse; sorghum; as well as other crops. In one embodiment, the lignocellulosic material comprises only one kind of biomass, for example wheat straw, but in other embodiments also mixtures can be used. The lignocellulosic material may be utilized directly as obtained or the particle size of the material can be reduced by mechanical treatment (e.g. milling, crushing, grinding, shredding, chopping, disc refining). Generally, any biological material that might be responsive to the above mentioned step i) for the isolation of lignin or derivatives thereof should be considered as a suitable starting material for the process according to the present invention.

Lignin Isolation

The lignin used as raw material for the present invention is isolated from the lignocellulosic material by any suitable state-of-the-art pulping method, e.g. by a kraft, soda, organosolv pulping process. In a preferred embodiment the lignin is isolated as pure as possible; preferable it should be free of sugar. Detailed description of the extraction of such a sugar free lignin using a combined alkaline organosolv pulping is described in publications like WO 2011/014894. Exemplarily, an aqueous organic solution comprising water and at least one water miscible organic alcohol, preferably methanol or ethanol, may be used for the sugar free lignin extraction.

Preparation of Oxyalkylated Lignin

The oxyalkylation step (b) in one embodiment of the present invention may be carried out as appropriate. A detailed description of the oxyalkylation step is disclosed in WO 2013/113462, but the present invention is not limited to a certain method of oxyalkylation. Suitable oxyalkylating agents include propylene oxide, ethylene oxide, butylene oxide or isobutylene oxide.

Lignin, in one embodiment of the present invention, may be placed into a high pressure reactor together with a catalyst, preferably a base, e.g. in the form of a finely ground powder. In a process of the present invention Lewis or Brønsted bases may be used as catalysts, in particular alkali or earth-alkali metal bases, in particular a hydroxide, such as KOH or NaOH. Typically between 0.01 and 0.25 g KOH per gram of dry lignin are used, depending on the amount of oxyalkylating agent. For oxypropylation, a defined amount of propylene oxide (PO) may be added to the mixture of lignin and the base obtained, in a preferable embodiment of the present invention the ratio lignin/PO is in the range of from 10/90 to 50/50% (w/w). For a better homogenization of the reaction mixture, especially for small amounts of PO, a suspending agent (e.g. isopropanol) may be added. The mixture obtained is heated up to a temperature between 70 and 120° C., such as 80 to 110° C., e.g. to 100° C., in one embodiment after flushing with an inert gas, e.g. nitrogen or argon. The pressure rises upon heating because of the transition of liquid PO into gaseous PO. Although inert gas is used in this embodiment, the reaction should also be possible under air. In one preferred embodiment of the process the mixture is subjected to an additional inert gas pressure before heating up, e.g. a pressure between 5 and 50 bar, such as 10 to 30 bar, e.g. 10 bar. The reaction may be followed by any means as appropriate, e.g. by observing the pressure in the reactor. The pressure is increasing while temperature is rising, and—after reaching a maximum—decreasing, reflecting the consumption of propylene oxide. After termination of the reaction (relative pressure is reaching zero or the level of the inert gas excess pressure) the reactor may be flushed with inert gas to remove eventual unreacted PO, and the mixture obtained is treated with a solvent, e.g. an organic solvent, in one particular aspect with methanol. The mixture obtained is filtered in order to remove any solids. From the filtrate obtained, solvent is evaporated. The evaporation residue obtained is dried, e.g. in a vacuum drying chamber, preferably at low temperatures, e.g. from room temperature up to 50° C., such as 40 to 50° C.

The resulting product consists of a mixture of two polyols, one from the oxypropylation of the lignin and the other from the homopolymerization of propylene oxide. For the production of alkyd resin prepolymers, it is preferable to remove the low molecular weight polypropylene glycol homopolymers and oligomers. Isolation of the purified hydroxypropyl lignin is carried out by dissolving the mixture comprising both polyols in an organic solvent, e.g. methanol or acetonitrile, and the mixture obtained may be extracted, e.g. in a liquid-liquid extractor, with organic solvent which is not fully miscible with the solvent used for dissolution, e.g. a hydrocarbon, such as pentane, hexane or heptane, e.g. under reflux of the extraction solvent. In the extraction solvent the propylene oxide homopolymer, e.g. the main part thereof, and in the remaining solution the oxypropylated lignin, e.g. the main part thereof, is obtained.

The remaining solution comprising the oxypropylated lignin may be concentrated, e.g. by evaporation of the main part of the solvent, and the evaporation residue obtained, e.g. in the form of a syrup, may be treated with acidulated water, e.g. may be dropped into acidulated water, e.g. water acidulated with an inorganic acid, such as HCl, e.g. HCl conc. Precipitation occurs and liquid still present (water and organic solvent, e.g. acetonitrile) may be removed, e.g. by centrifugation. The centrifugation residue obtained may be washed with water, e.g. until the supernatant shows a neutral pH and dried in a vacuum drying chamber at appropriate temperatures, e.g. at low temperatures such as from room temperature to 50° C., e.g. from 40 to 50° C. Oxypropylated lignin may be obtained. Confirmation that the hydroxyl groups of the lignin have reacted quantitatively may be obtained by appropriate analysis, e.g. via $^{31}$P NMR spectroscopy. Such a method for quantification of lignin's functional groups was described by A. Granata and D. S. Argyropoulos, J. Agric. Food Chem., 1995, 43, 1538-1544.

Instead of oxypropylation, for obtaining even more reactive primary hydroxyl groups, also oxyethylation can be carried out. The oxyethylation process is performed in a manner very similar to oxypropylation process. Instead of propylene oxide, liquefied ethylene oxide (EO) is added to the mixture of lignin and the catalyst in the high pressure reactor. Liquefaction of ethylene oxide may be carried out in a gas condenser using a methanol/liquid nitrogen slurry as cooling agent. The desired amount of ethylene oxide can be collected with a test tube and transferred into the reactor, preferably the ratio lignin/EO is in the range of from 10/90 to 50/50% (w/w). As well as for the oxypropylation process, also alkaline catalysis is preferred for oxyethylation. In a preferable embodiment a hydroxide is used as catalyst, such as KOH or NaOH, most preferable is KOH, optionally together with a co-catalyst, e.g. a crown ether, such as 18-crown-6. For a better homogenization of the reaction mixture, especially for small amounts of E0, a suspending agent (e.g. isopropanol, dioxane) may be added. The mixture obtained is heated up to a temperature between 60 and 100° C., such as 70 to 90° C., e.g. to 80° C., typically under inert gas, preferable under inert gas excess pressure. After completion of the reaction and cooling down the reactor to room temperature, excess ethylene oxide is removed by flushing the reactor with nitrogen gas. Then the mixture obtained is treated with a solvent, e.g. an organic solvent, such as an alcohol, in one particular aspect methanol and the corresponding solution is filtered in order to remove any solids. The catalyst may be precipitated with stoichiometric amounts of 1N acetic acid in methanol. From the filtrate obtained, solvent is evaporated. The evaporation residue obtained is dried, e.g. in a vacuum drying chamber, preferably at low temperatures, e.g. room temperature up to 50° C., such as 40 to 50° C.

Isolation of the purified hydroxyethyl lignin may be performed by dissolving the mixture comprising both polyols in water and enclosing the solution in a cellophane dialysis tubing (e.g. 3,500 MWCO). A preferable concentration of the solution is 10% w/w. Then the tube can be placed in a vessel filled with water. Dialysis may be carried out under magnetic stirring for a certain period of time, e.g. for 12 hours and, in a preferred embodiment the dialysis water is replaced after two and six hours, respectively. After dialysis, the sample may be removed from the dialysis tubing, water is evaporated and the product was obtained is dried, e.g. in a vacuum drying chamber, preferably at low temperatures, e.g. room temperature up to 50° C., such as 40 to 50° C. Confirmation that the hydroxyl groups of the lignin have reacted quantitatively may be obtained in the same way as for oxypropylation, e.g. via $^{31}$P NMR spectroscopy.

In comparison to native lignin, oxyalkylated lignin exhibits improved uniformity and accessibility of the reactive sites, increased reactivity of the functional groups and very good solubility in most common solvents.

Preparation of Lignin-Based Alkyds by Reaction with Fatty Acids and Derivatives Thereof The esterification step (c) in a preferred embodiment of the present invention may be carried out as follows. Purified oxyalkylated lignin obtained in step (b) is functionalized with different saturated or unsaturated fatty acids, or their corresponding methyl esters (FAME). Fatty acids may be employed as such or by way of employing oils, especially naturally occurring oils, containing the fatty acids. Preferably, the fatty acids or FAME employed stem from the group selected of, but not limited to, linseed oil, castor oil, dehydrated castor oil, sunflower oil, tall oil, rapeseed oil, palm oil, fish oil, soya oil, safflower oil, hempseed oil, olive oil, tung oil, corn oil, cottonseed oil, coconut oil, oiticica oil, wood oil and all kind of blends thereof.

In order to obtain drying alkyds, the fatty acids and/or fatty acid derivatives or mixtures thereof employed in step c) should have a suitably high iodine value.

In order to obtain drying alkyds, especially preferably the fatty acids and/or fatty acid derivatives in step (c) are preferably selected from the group consisting of linoleic acid, linolenic acid, dehydrated castor oil fatty acids, derivatives of said fatty acids, and mixtures thereof. Linoleic acid as one of the preferred fatty acids employed in the present invention has an iodine value of about 180.

A lignin prepolymer obtainable according to the present invention which is drying preferably exhibits an iodine value of 80 or more, preferably 90 or more, such as 90 to 130.

Accordingly, in order to obtain non-drying alkyds, such as baking enamels, fatty acids or fatty acid derivatives with a suitably low iodine value may be employed, such as e.g., ricinoleic acid. Ricinoleic acid has the further advantage of having a free OH-group which in an enamel is available for esterification with acids.

A lignin prepolymer obtainable according to the present invention may exhibit a lignin content of 20% to 35% and a fatty acid content of from 30% to 50%.

Esterification of oxyalkylated lignin compared to esterification of native lignin is advantageous in regard to solubility and reactivity. Oxyalkylated lignin shows a high reactivity of its hydroxyl groups towards fatty acids in principle so that pre-activation steps can be avoided (e.g. synthesis of fatty acid chlorides or fatty acid anhydrides).

In one embodiment esterification of oxyalkylated lignin may be carried out in solution using an apparatus for azeotropic removal of water for continuously removing the water generated during the reaction. Oxyalkylated lignin obtained in step (b) and the fatty acid may be dissolved in an organic solvent which forms an azeotrope with water.

In one embodiment of the present invention linoleic acid is used to react with the oxyalkylated lignin. Suitable solvents include toluene for the esterification of oxypropylated lignin and chloroform for oxyethylated lignin and the reaction is carried out under reflux of the solvent. Conveniently an excess molar amount of at least one fatty acid may be used to ensure complete conversion of the hydroxyl groups. But also a shortage of fatty acid groups to lignin's hydroxyl groups may be applied when only a partially esterified product is aimed for.

In a preferred embodiment a catalyst is used to increase the reaction rate and yield of the esterification. Generally every conventional acid or alkaline catalyst can be employed, preferable an acidic catalyst may be used, such as sulfuric acid, hydrochloric acid, phosphoric acid, tosylic acid and Lewis acids, most preferable is tosylic acid.

The reaction is continued under reflux of the solvent until no further separation of water can be observed. Then the reaction product is obtained by vacuum evaporation of the solvent. For purification the sample may be dissolved in an appropriate solvent, and the organic phase may be washed with water and saturated $NaHCO_3$-solution several times.

After drying over an inert drying agent, e.g. anhydrous $Na_2SO_4$ or $MgSO_4$, filtering of the solution and vacuum evaporation of the solvent, the product is dried, e.g. in a vacuum drying chamber, preferably at low temperatures, e.g. room temperature up to 50° C., such as 40 to 50° C. When a huge excess of fatty acid is applied, it may be preferable to remove excess fatty acid by medium pressure liquid chromatography (MPLC).

In another embodiment, especially preferably for larger scale reactions, excess fatty acid may be removed by dissolving the sample in ethyl acetate and filtering the solution. Then one molar equivalent of $Na_2CO_3*10H_2O$ (related to the amount of free fatty acid in the sample) and one molar equivalent acid-activated bentonite may be added to the mixture which is then refluxed for one hour.

After filtering the solution for the removal of precipitates and washing it with brine and water several times it may be dried over $Na_2SO_4$. After evaporation of the solvent, the purified product is dried under high vacuum. The successful removal of excess fatty acid may be confirmed via gel permeation chromatography (GPC). Confirmation that the hydroxyl groups of the oxyalkylated lignin have reacted quantitatively may be obtained via $^{31}P$ NMR spectroscopy.

In another embodiment of the present invention the esterification of oxyalkylated lignin with fatty acids is carried out in bulk. In this method oxyalkylated lignin, the fatty acid, and the catalyst are placed in a flask, e.g. a three-necked round bottom flask, and homogenized. Preferably the flask is connected to a fractionating column. Same conditions regarding type and amount of catalyst and fatty acid are employable as described above for the reaction in solvent.

To facilitate the homogenization process a small amount of solvent just sufficient to homogenize the mixture, may be added to the reaction mixture, e.g. toluene for oxypropylated lignin and chloroform for oxyethylated lignin. In one embodiment of the present invention, the reaction is carried out under inert atmosphere, e.g. the reaction apparatus is flushed with nitrogen or argon. The reaction mixture is stirred in an oil bath at a temperature between 100 and 150° C., e.g. 130° C. for a certain period of time, e.g. two hours. When solvent has been used for the homogenization process, it is distilled off during the heating of the reaction mixture. Then the reaction apparatus is slowly evacuated to 10 mbar over a certain period of time, e.g. over another two hours to remove the water formed during the reaction and shift the equilibrium to the esterified product. After cooling the reaction mixture down to room temperature excess fatty acid can be removed as described above.

In another embodiment of the present invention transesterification of oxyalkylated lignin with fatty acid methyl ester (FAME) is performed. First of all FAME is synthesized from different oils (described above) using standard procedures. In one embodiment linseed oil, fish oil and castor oil is used for the production of FAME. For example, 25 g of the particular oil are dissolved in 40 ml 0.5 N KOH in methanol and refluxed under inert atmosphere for 1 to 2 hours. After cooling to room temperature the reaction mixture is poured into 60 ml 0.5N HCl and phases are separated. The aqueous phase may be extracted twice with an organic solvent, e.g. petroleum ether. The combined organic phases are washed with distilled water and dried over $Na_2SO_4$. FAME is obtained after evaporation of the solvent and can directly be used for the transesterification step. The fatty acid composition of the FAME may be determined via gas chromatography using fatty acid standards.

In one embodiment transesterification of oxyalkylated lignin with FAME is carried out using a method very similar to the esterification with fatty acids described above. Oxyalkylated lignin, FAME, and the catalyst are placed in a flask, e.g. a three-necked round bottom flask, and homogenized. Oxypropylated lignin and FAME exhibit perfect miscibility. In case oxyethylated lignin is used, a small amount of chloroform sufficient to achieve homogenization of the oxyethylated lignin phase and the FAME phase, e.g. a volume of 10 ml, may be added to facilitate the homogenization process. Preferably the flask containing the reaction mixture is connected to a fractionating column. FAME may be used in excess, preferable 1.1-15 molar equivalents, more preferable 1.5-7 molar equivalents, in relation to the number of hydroxyl groups of the oxyalkylated lignin. Same conditions regarding type and amount of catalyst are used than described above. In one embodiment of the present invention, the reaction is carried out under inert atmosphere, e.g. the reaction apparatus is flushed with nitrogen or argon. The reaction mixture is stirred at an oil bath temperature between 100 and 150° C., e.g. 130° C. for a certain period of time, e.g. two hours. Then the reaction apparatus is slowly evacuated to 10 mbar over a certain period of time, e.g. over another two hours to remove the methanol formed during the reaction and shift the equilibrium to the transesterified product. After stirring at 10 mbar for a certain period of time, e.g. at least for another hour, the flask may be flushed with inert gas and cooled to room temperature. Due to the very limited solubility of fatty alkyl chains containing substances in methanol compared to methyl esters of fatty acids, the reaction mixture may be poured into ice-cooled methanol for the separation of excess FAME. Through washing the solid residue with ice-cooled methanol several times, excess FAME can be removed nearly quantitatively. In one embodiment of the present invention the fatty acid lignin derivative is dissolved in an organic solvent, e.g. ethyl acetate, and the corresponding solutions may be washed twice with saturated $NaHCO_3$, once with distilled water and dried over $Na_2SO_4$. After evaporation of the solvent, the product was dried under high vacuum. The successful removal of excess fatty acid may be confirmed via gel permeation chromatography (GPC) in THF, as described above. Confirmation that the hydroxyl groups of the oxyalkylated lignin have reacted quantitatively may be obtained via $^{31}P$ NMR spectroscopy.

Alternatively, oxyalkylated lignins can also be reacted with a fatty acid derivative, such as a fatty acid chloride, employing alkaline catalysts, such as imidazoles, especially 1-methylimidazole. Of course, in this embodiment the advantage of not having to previously activate the fatty acid is lost.

Preparation of Lignin-Based Drying Alkyd Coatings

In one embodiment of the present invention the lignin-based alkyds obtained in step (c) are cured under air. The lignin-based alkyds can be used alone or in combination with other components to obtain a broad variety of desired properties.

To speed up the curing process, drying agents, so called siccatives, may be added to the formulation. Typically metal salts from ions of cobalt, manganese, iron, nickel, lead, chromium, zinc, cerium, aluminum, calcium, neodymium or zirconium, and lipophilic carboxylic acids, e.g. naphthenic acids, resin acids, oleic acid, linoleic acid, octoic acid are used to promote the free-radical chemical crosslinking through autooxidation of the unsaturated fatty acid residues with air. Most frequently cobalt driers as naphthenates or octoates are used, typically in combination with other driers. In one embodiment of the present invention cobalt naphthenate may be used as drying agent.

It also may be favorable to use a mixture of different driers, typically in amounts from 0.01 to 2% by weight, on the alkyd content, preferably from 0.05 to 1%, e.g. 0.1%. In one embodiment of the present invention a commercially available siccative (S1) composed of different cobalt salts in white spirit (10% by weight) was used. A cobalt metal content of approximately 1% by weight was determined gravimetrically. White spirit is the most commonly used solvent in paints, lacquers and varnished and is composed of the naphtha cut with a boiling range from 130 to 190° C. and has a content of aromatics of approximately 10%. Alternatively a second siccative (S2) composed of cobalt naphthenate, zirconium octoate and calcium octoate was prepared. This mixture should be especially suitable for curing long oil alkyd resins. Alternatively—as greener choice—enzymatic hardening may be applied, e.g. laccase-mediator systems may be used for catalyzing the curing process.

The curable formulation may be applied to any substrate such as glass, wood, metal, plastic, stone, fibers, etc. by methods such as roll coating, dipping, spraying, brushing or any other method typically employed in the art. The lignin-based alkyds may be diluted with an apolar solvent; typically white spirit may be used. In one embodiment of the present invention ethyl acetate, a solvent less environmentally harmful compared to white spirit, was used. The weight ratio of alkyd to solvent may be between 2:1 and 8:1, e.g. 3:1. In one embodiment the siccative may be dissolved in the solvent and the desired amount of lignin-based alkyd, may be placed in a test tube. Then the desired volume of siccative solution may be added to the lignin-based alkyd, e.g. via an Eppendorf pipette. The metal content in the coatings was 0.1% by weight of cobalt for S1 and 0.05% cobalt, 0.3% zirconium and 0.1% calcium for S2. However, any composition of the metal salts listed above can be applied, as well as different concentrations.

In one embodiment of the present invention the formulation consisting of lignin-based alkyd, solvent and siccative is mixed homogenously and afterwards applied to the desired substrate, e.g. a glass plate, using wire rods which guarantee a certain film thickness, e.g. 40 μm. The curing process can be carried out at ambient temperatures or elevated temperatures and monitored by scratching the surface with a needle every hour. In one embodiment of the present invention beside the alkyd, the drier agent and the diluting solvent also a variety of different additives may be added to the formulation, including all kind of fillers, colorants, etc. Also the performance of the cured coating can be tuned by combining the lignin-based alkyds with other materials such as other alkyds, polyesters, epoxy resins, vinyl resins, acrylic resins, polyurethanes or any other kind of useful material.

EXAMPLES

The present invention will now be described with specific reference to experimental work carried out to evaluate methods of preparing modified lignin and other materials that were prepared. The experimental disclosure is not intended to be limiting for the scope of the present invention.

Example 1

Lignin Extraction 1500 g of wheat straw (21% lignin content, particle size≈2 cm) were contacted with a solution comprising water and 52% by weight of EtOH in the presence of 10% by weight of NaOH (related to the dry mass of the straw) at 70° C. for 18 hours. The consistency of the reaction mixture was 10% by weight at the beginning. The lignin solution was separated by filtration of the reaction suspension at room temperature. Then lignin was isolated from the lignin solution by dropping the pH of the solution with sulfuric acid to 5 and successive evaporation of EtOH. The precipitated lignin was centrifuged, washed with water and dried in vacuum. Important parameters of the isolated lignin like content of important functional groups, weight-average molecular weight ($M_w$), number average molecular weight ($M_n$), polydispersity index (PDI) and ash content are displayed in Table 1. Quantification of the functional groups was performed by $^{31}$P NMR spectroscopy, molecular weight distribution was measured by size exclusion chromatography (HPLC-SEC). HPLC-SEC measurements in DMF were performed on an Agilent 1200 Infinity with three TOSOH TSK-GEL Alpha Series columns (TSKgel Alpha-2500; TSKgel Alpha-3000 and TSKgel Alpha-4000) in a row. Approximately 5 mg of sample material was dissolved in 1 mL of DMF +LiBr (1 g/L). 20 µL of this solution were injected for analysis and eluted with a solution of lithium bromide in DMF (1 g/L LiBr) at a column temperature of 50° C. (eluation time 90 min). Lignin was detected by UV absorption (280 nm) and measured against polystyrene standards which were purchased from the PSS GmbH, Mainz. The standards had following molar masses at the peak maximum (g/mol): 277000, 130000, 66000, 34800, 17600, 9130, 3250, 1250, 682. The integration was performed until the volume corresponding to the mass of 300 g/mol.

TABLE 1

Properties of the isolated lignin

| | | |
|---|---|---|
| total OH | [mmol/g] | 5.81 |
| phenolic OH | [mmol/g] | 1.37 |
| COOH | [mmol/g] | 1.12 |
| $M_w$ | [g/mol] | 5889 |
| $M_n$ | [g/mol] | 1332 |
| PDI | [—] | 4.42 |
| Ash | [%] | <0.5 |

Example 2

Oxypropylation of Lignin

A representative example of an oxypropylated lignin was prepared as follows:

Oxypropylation of lignin was carried out in bulk using a high pressure laboratory reactor equipped with a polytetrafluoroethylene insert, a thermal sensor and an electric pressure meter. For reactions on a small scale a reactor with 40 ml volume and for larger-scale reactions a reactor with 750 ml volume were used. Lignin was obtained as fine-grained powder and dried at 45° C. in a vacuum drying chamber before use. The reactor was loaded with a defined amount of dry lignin and the corresponding quantities of catalyst, e.g. finely ground KOH or NaOH powder (0.01-0.25 g per gram of dry lignin, e.g. an amount as set out in Table 2 below) and propylene oxide (1 to 9 g per gram of dry Lignin, e.g. an amount as set out in Table 2 below). Optionally also more than 9 g of propylene oxide per gram of dry lignin may be used. The reactor was flushed with inert gas (argon), sealed and subjected to an inert gas (nitrogen) excess pressure of 10 bar (between 10 and 30 bar).

The reaction mixture was heated to 100° C. under stirring for 10 hours. After cooling down to room temperature, the reaction mixture was dissolved in methanol and the resulting solution was filtered for removal of any residual solids. The products were recovered by removal of the solvent in vacuo.

The resulting liquid polyol mixture consisted of oxypropylated lignin and propylene oxide homopolymer and was dried at 45° C. in a vacuum drying cabinet.

Isolation of Pure Oxypropylated Lignin:

The viscous polyol mixture obtained in Example 2 was dissolved in acetonitrile and poured into a liquid-liquid extractor which was charged with hexane. The extraction was carried out by refluxing hexane for 48 hours. The hexane fraction contained practically all of the polypropylene oxide homopolymer. The acetonitrile solution obtained containing practically all of the oxypropylated lignin as well as water-soluble polypropylene glycol oligomers and catalyst was concentrated on a rotary evaporator. The resulting syrup was precipitated into a large excess of acidulated water, and washed with distilled water several times. The water was centrifuged off and the product obtained was washed with water several times until the supernatant was neutral and then dried in a vacuum drying cabinet at 45° C. The resulting oxypropylated lignin was sticky, having a very high viscosity and was used for esterification with fatty acids.

TABLE 2

Examples of oxypropylation parameters and properties of the isolated lignopolyols after purification

| Reaction | Type of catalyst | Lig/ (Lig + PO) [%] | Catalyst [%] | Yield 1 [%] | Homo-polymer [%] | Yield 2 [%] | OH value [mmol/g] | Viscosity (50° C., 10 s$^{-1}$) [Pa · s] |
|---|---|---|---|---|---|---|---|---|
| A_PO | KOH | 15.9 | 1.3 | 70 | 47 | 21 | 2.42 | 73 |
| B_PO | KOH | 19.1 | 1.5 | 93 | 45 | 40 | 2.20 | 46 |
| C_PO | NaOH | 19.4 | 1.0 | 80 | 48 | 32 | 2.27 | 203 |
| D_PO | NaOH | 22.2 | 1.2 | 83 | 32 | 42 | 2.82 | 94 |
| E_PO | NaOH | 57.3 | 17.8 | 84 | 23 | 52 | 3.99 | 1550 |

The values indicated in [%] designate the ratio of the respective compound to the overall amount of Lignin and PO Yield 1: yield of the liquid polyol mixture Yield 2: yield of the lignopolyols after purification steps OH value and viscosity were measured from the purified lignopolyols.

Example 3

Oxyethylation of Lignin

A representative example of an oxyethylated lignin was prepared as follows:

Oxyethylation of lignin was carried out in bulk using a high pressure laboratory reactor equipped with a polytetrafluoroethylene insert, a thermal sensor and an electric pressure meter. For reactions on a small scale a reactor with 40 ml volume and for larger-scale reactions a reactor with 750 ml volume were used. Lignin was obtained as fine-grained powder and dried at 45° C. in a vacuum drying chamber before use. The reactor was loaded with a defined amount of dry lignin and the corresponding quantities of finely ground KOH powder (0.01-0.3 g per gram of dry lignin). Ethylene oxide was liquefied in a Büchi gas condenser using a methanol/liquid nitrogen slurry as cooling agent. The desired amount of ethylene oxide (1 to 9 g per gram of dry Lignin, e.g. an amount as set out in Table 3 below) was collected with a scaled joint test tube and transferred into the reactor. Optionally also more than 9 g of ethylene oxide per gram of dry lignin may be used. In some embodiments of this method, 1,4-dioxane was added as a suspending agent (e.g. 20 ml for 5 g of lignin).

Then the reactor was sealed and the reaction mixture was heated to 80° C. under stirring for 10 hours. For acceleration of the reaction the reactor can be subjected to an inert gas (nitrogen) excess pressure of 10 bar (between 5 and 30 bar) which leads to a reaction time of only three hours. After cooling down the reactor to room temperature, excess ethylene oxide was removed by flushing the reactor with nitrogen. The reaction mixture was dissolved in methanol and the resulting solution was filtered for removal of any residual solids. (Catalyst was precipitated with stoichiometric amounts of 1N acetic acid in methanol.) The products were recovered by vacuum distillation of the solvent.

Isolation of Pure Oxyethylated Lignin:

For the removal of polyethylene glycol oligomers, low-molecular weight homopolymers and catalyst the liquid polyol mixture obtained was dissolved in water and the solution (10% w/w) was enclosed in cellophane dialysis tubing (3,500 MWCO). The tube was placed in a 5 l beaker filled with distilled water. The solution was dialyzed under magnetic stirring for at least 12 hours and dialysis water was replaced after two and six hours respectively. After dialysis, the sample was removed from the dialysis tubing, water was evaporated and the product was dried under high vacuum at 50° C.

TABLE 3

Examples of oxyethylation parameters and properties of the isolated lignopolyols after purification in bulk and in suspension

| Reaction | Type of reaction | Type of catalyst | Lig/ (Lig + EO) [%] | Catalyst [%] | Yield [%] | Homo-polymer [%] | OH value [mmol/g] | Viscosity (50° C., 10 s$^{-1}$) [Pa · s] |
|---|---|---|---|---|---|---|---|---|
| A_EO | bulk | KOH | 8.4 | 1.9 | 67 | 32 | 3.76 | solid |
| B_EO | bulk | NaOH | 8.4 | 2.6 | 57 | 38 | 3.74 | solid |
| C_EO | bulk | KOH | 11.0 | 1.4 | 65 | 35 | 3.12 | 326 |
| D_EO | bulk | NaOH | 11.1 | 2.0 | 68 | 33 | 3.13 | 66 |
| E_EO | Suspension | KOH | 12.0 | 1.9 | 96 | 30 | 3.62 | 85 |

The values indicated in [%] designate the ratio of the respective compound to the overall amount of Lignin and EO
Yield: yield of the liquid polyol mixture
OH value and viscosity were measured from the purified lignopolyols.

Example 4

Esterification of Oxyalkylated Lignin 1 eq oxyalkylated lignin purified from homopolymers and oligomers (product from Example 2 (oxypropylated lignin) and Example 3 (oxyethylated lignin), respectively), 1.5 eq linoleic acid (related to OH number of oxypropylated lignin and oxyethylated lignin, respectively) and 15 mol % p-toluenesulfonic acid were placed in a three-necked round-bottom flask with fractionating column under argon atmosphere and dissolved in a suitable amount of toluene (in the case of oxypropylated lignin) and chloroform (in the case of oxyethylated lignin), respectively. The reaction mixture was refluxed for two hours and then slowly evacuated to 10 mbar to remove water formed during the reaction and solvent. After stirring for at least another hour at 10 mbar (or until gas evolution ceased), the flask was flushed with argon and cooled to room temperature.

Purification for Removal of Unreacted Linoleic Acid:

The sample was dissolved in ethyl acetate and the solution obtained was filtered. After adding 1eq $Na_2CO_3*10H_2O$ (related to amount of free linoleic acid in the sample) and 1 eq acid-activated bentonite the mixture was refluxed for one hour. The precipitates formed were filtered off and the solution was washed with brine and water and dried over $Na_2SO_4$. After evaporation of the solvent, the product was dried under high vacuum.

Table 4 shows the properties of the purified esters of oxyalkylated lignin with linoleic acid. Size exclusion chromatography (SEC) was performed in THF using polystyrene standards (Waters 515 HPLC-SEC system. three 7.3×300 mm styragel columns (guard column, HR 0.5, HR 3 and HR 4), flow rate 1 ml/min at 40° C.).

TABLE 4

Examples of esterification of oxyalkylated lignopolyol with linoleic acid and properties of the products

| Reaction | Starting product* | Iodine value g I$_2$/100 g | Surface tension [mN/m] | Degree of esterification [%] | MW [g/mol] | Density [g/cm$^3$] | Viscosity (20° C., 10 s$^{-1}$) [Pa · s] |
|---|---|---|---|---|---|---|---|
| E1 | D_PO | 113 | 22.95 | 94 | 6471 | 0.985 | 6 |
| E2 | E_EO | 122 | 24.54 | 95 | 3711 | 0.992 | 0.2 |

*The denominations refer to the reaction products of Table 2 and Table 3, respectively
Product E1 was found to be already fully drying without additives (except a siccative). It was found that propoxylated lignins resulted in esterified products that were already fully drying at lower iodine values as compared with ethoxylated lignins.

Example 5

Transesterification of Oxyalkylated Lignin with FAME 1 eq oxyalkylated lignin purified from homopolymers and oligomers (product from Example 2 (oxypropylated lignin) and Example 3 (oxyethylated lignin), respectively), 1.5-10 eq of desired fatty acid methyl ester (FAME), eq related to OH number of oxyalkylated lignin, and 15 mol % p-toluenesulfonic acid were placed in a three-necked round-bottom flask with fractionating column under argon atmosphere. When oxypropylated lignin was used, no additional solvent was needed. In the case of oxyethylated lignin, the reaction mixture was dissolved in the amount of chloroform which was necessary for homogenization. Then the homogenized reaction mixture was heated at 130° C. (oil-bath temperature) for two hours and then slowly evacuated to 10 mbar to continuously remove methanol formed during the reaction and also chloroform in case oxyethylated lignins were used. After stirring for at least another hour at 10 mbar (or until gas evolution ceased), the flask was flushed with argon and cooled to room temperature. The reaction mixture was poured into ice-cold methanol and the precipitate was collected by decanting the supernatant. The solid residue was thoroughly washed with ice-cooled methanol several times and then dissolved in ethyl acetate. The solution was washed twice with saturated NaHCO$_3$, once with distilled water and dried over Na$_2$SO$_4$. After evaporation of the solvent, the product was dried under high vacuum.

Table 5 displays the properties of the purified esters of oxypropylated lignin with two different kinds of FAME. For both reactions, the molecular excess of FAME was 10-fold.

Example 6

Preparation of Lignin-Based Drying Alkyd Coatings 0.1 g of the respective lignin alkyd (see examples above) were placed in a test tube and dissolved in 35 µl ethyl acetate. Then 100 µl of the siccative solution were added and the mixture was homogenized. When siccative 1 (S1) was used, the concentration of cobalt in the formulation was 0.1%. For siccative 2 (S2) the cobalt concentration was 0.05%, additionally to 0.3% zirconium and 0.1% calcium. A wire-wound rod was used to uniformly spread the coating solution onto a glass plate resulting in films of 40 µm thickness. The progress in the curing process performed at room temperature under air was controlled by scratching the coating with a needle hourly. As control two commercially available alkyd resins from Kraemer© (the long oil alkyd Rokralux S286 and the medium oil alkyd Rokralux S 245) were tested under the same conditions. Properties of the reference alkyds are displayed in Table 6.

TABLE 6

Properties of the reference alkyds from the Rokralux series

| Reference alkyd | Type of alkyd | Iodine value [g I$_2$/100 g] | oil content [%] | Surface tension [mN/m] | MW [g/mol] | viscosity [Pa · s] |
|---|---|---|---|---|---|---|
| S 286 | long oil | 105 | 86 | 23.78 | 8551 | 2.3 |
| S 450 | medium oil | 64 | 50 | 27.95 | 7053 | 36 |

From cured coatings also the extractable content was analyzed by placing the glass plates into a beaker filled with 30 ml acetone for 24 hours. The mass lost was determined by weighing the glass plates before and after the extraction and considering the weight of the glass plate. Film hardness of vacuum-dried films was measured by nanoindentation in accordance with DIN EN ISO 14577-4.

TABLE 5

Examples of transesterifaction of oxypropylated lignopolyols with FAME and properties of the products

| Reaction | Origin of FAME | Starting product* | free OH groups [mmol/g] | Iodine value [g I$_2$/100 g] | Surface tension [mN/m] | Degree of esterification [%] | MW [g/mol] | Density [g/cm$^3$] | Viscosity (20° C., 10 s$^{-1}$) [Pa · s] |
|---|---|---|---|---|---|---|---|---|---|
| E3 | fish oil | C_PO | 0.21 | 100 | 23.74 | 90 | 8310 | 0.991 | 2 |
| E4 | linseed oil | D_PO | 0.09 | 89 | 25.94 | 95 | 9803 | 0.979 | 20 |

*The denominations refer to Table 2.

TABLE 7

Properties of the lignin-based alkyds in comparison with the reference alkyds

| Alkyd | curing time [h] | | mass loss [%] | | Indenter hardness $H_i$ [Mpa] | | Reduced Young's modulus $E_r$ [Mpa] | |
|---|---|---|---|---|---|---|---|---|
| | S1 | S2 | S1 | S2 | S1 | S2 | S1 | S2 |
| E1 | 3 | 12-24 | 28 | 258 | 0.81 | 0.82 | 9.5 | 7.2 |
| E3 | 3 | 12-24 | 41 | 32 | 0.3 | 0.42 | 5.4 | 6.3 |
| S286 | 3 | 4 | 17 | 16 | 0.69 | 0.95 | 9.4 | 10.7 |
| S450 | 4 | 4 | 61 | 54 | 0.46 | 0.36 | 82.5 | 27.8 |

The respective lignin and fatty acid content of alkyds E1 to E4 was determined to be as follows by way of calculation based on the chain lengths and, subsequently, the degree of esterification:

TABLE 8

Lignin and fatty acid content of alkyds E1 to E4

| Alkyd | Lignin [%] | Fatty acid [%] |
|---|---|---|
| E1 | 32 | 41 |
| E2 | 34 | 47 |
| E3 | 31 | 35 |
| E4 | 32 | 41 |

The invention claimed is:

1. A method for the preparation of a lignin prepolymer, comprising:
   (a) providing a lignin;
   (b) reacting the lignin with a hydroxyl functionalization reagent to provide a lignin derivative containing at least one hydroxyl group, said hydroxyl group being obtained as a result of the interaction between the lignin and the hydroxyl functionalization reagent; and
   (c) reacting the lignin derivative obtained in step (b) with a functionalization reagent selected from the group consisting of fatty acids, fatty acid derivatives and mixtures thereof capable of reacting with the lignin derivative and forming a covalent bond between the fatty acid and/or the fatty acid derivative and the lignin derivative.

2. The method of claim 1 wherein the hydroxyl functionalization reagent in step (b) is selected from the group consisting of epoxides, $C_2$-$C_8$ epoxides, ethylene oxide, propylene oxide, cyclic mono- or diesters, $C_3$-$C_8$ lactones, ε-caprolactone, β-propiolactone or lactide, and mixtures thereof.

3. The method of claim 1, wherein in step (b) the reaction of the lignin with the hydroxyl functionalization reagent is performed in the presence of a base as a catalyst and at elevated temperature, and, optionally, at elevated pressure.

4. The method of claim 1, wherein the fatty acids and/or fatty acid derivatives in step (c) are selected from the group consisting of ricinoleic acid, linoleic acid, linolenic acid, derivatives of said fatty acids, and mixtures thereof.

5. The method of claim 1, wherein the reaction of the lignin derivative with the functionalization reagent to produce the lignin alkyd prepolymer is performed in the presence of an acidic catalyst using an inert solvent as a reaction medium.

6. The method of claim 1, wherein in step (c) the fatty acid derivatives are selected from the group consisting of anhydrides, acid chlorides, and mixtures thereof.

7. The method of claim 1, wherein the lignin provided in step (a) is obtained by pulping biomass, wherein said pulping is performed by contacting the biomass with an aqueous solution comprising at least one water miscible alcohol.

8. A method for the preparation of a polymer, comprising:
   (a) providing a lignin;
   (b) reacting the lignin with a hydroxyl functionalization reagent to provide a lignin derivative containing at least one hydroxyl group, said hydroxyl group being obtained as a result of the interaction between the lignin and the hydroxyl functionalization reagent; and
   (c) reacting the lignin derivative obtained in step (b) with a functionalization reagent selected from the group consisting of fatty acids, fatty acid derivatives and mixtures thereof capable of reacting with the lignin derivative and forming a covalent bond between the fatty acid and/or the fatty acid derivative and the lignin derivative to form a lignin prepolymer; and
   (d) polymerizing the lignin prepolymer to form the polymer.

9. The method of claim 8, wherein polymerizing the lignin prepolymer comprises curing the lignin prepolymer to produce an alkyd resin, wherein the curing is performed either oxidatively or thermally.

10. The method of claim 3, wherein the hydroxyl functionalization reagent comprises ethylene oxide or propylene oxide, the base comprises an inorganic base, and the elevated temperature is between 50° C. and 150° C.

11. The method of claim 10, wherein the elevated temperature is between 50° C. and 120° C.

12. The method of claim 5, wherein the acidic catalyst, is selected from an organic acid, an inorganic acid, and p-toluenesulfonic acid.

13. The method of claim 1, wherein the reaction of the lignin derivative with the functionalization reagent is performed without solvent mixing of the lignin derivative with the functionalization reagent at elevated temperature in presence of an acidic catalyst.

14. The method of claim 7, wherein the biomass comprises annual plants or parts thereof selected from miscanthus, sugar cane bagasse, soybean stover, corn stover, rice straw, barley straw, wheat straw, energy crops, elephant grass, switch grass and/or husk, hay, and combinations thereof.

15. The method of claim 14, wherein the at least one water miscible alcohol is a $C_1$-$C_4$ alcohol selected from methanol, ethanol, isopropanol, n-propanol, n-butanol, isobutanol, t-butanol, or a mixture thereof.

16. A method for the preparation of a lignin prepolymer, comprising:
   (d) providing a lignin;
   (e) reacting the lignin with a hydroxyl functionalization reagent to provide a lignin derivative containing hydroxyl groups, said hydroxyl groups being obtained as a result of the interaction between the lignin and the hydroxyl functionalization reagent; and
   (f) esterifying the lignin derivative obtained in step (b) with a functionalization reagent selected from the group consisting of fatty acids, fatty acid derivatives and mixtures thereof capable of forming esters with the hydroxyl groups of the lignin derivative and form ester bonds between the fatty acids and/or the fatty acid derivatives and the hydroxyl groups of the lignin derivative.

17. The method of claim 16, wherein the fatty acids and/or fatty acid derivatives are unsaturated.

18. The method of claim 16 wherein the hydroxyl functionalization reagent in step (b) is selected from the group consisting of epoxides, $C_2$-$C_8$ epoxides, ethylene oxide, and propylene oxide and wherein the lignin and the hydroxyl functionalization reagent are reacted in the presence of a base.

19. The method of claim 16, wherein the lignin prepolymer exhibits a lignin content of 20% to 35% and a fatty acid content of from 30% to 50%.

20. The method of claim 16, wherein the lignin prepolymer exhibits an iodine value of 80 or more.

* * * * *